Aug. 3, 1965 R. T. KLEMPAY 3,198,931
SHEARWELDER
Filed Jan. 10, 1963 10 Sheets-Sheet 1

INVENTOR.
RAYMOND T. KLEMPAY
BY
*Fay & Fay*
ATTORNEYS

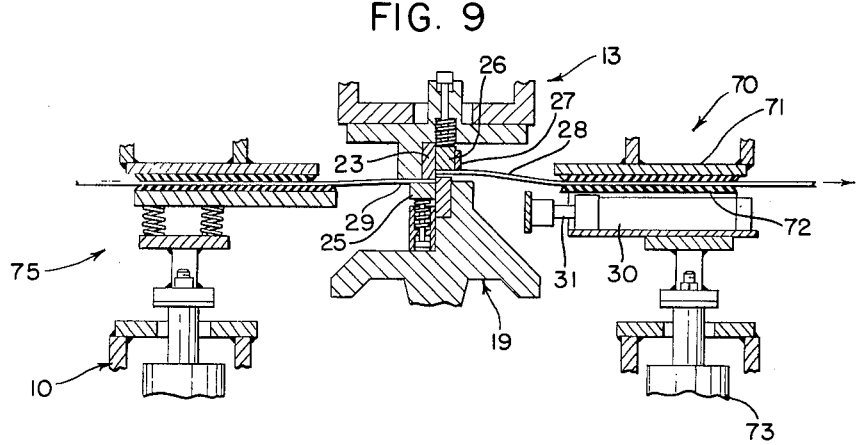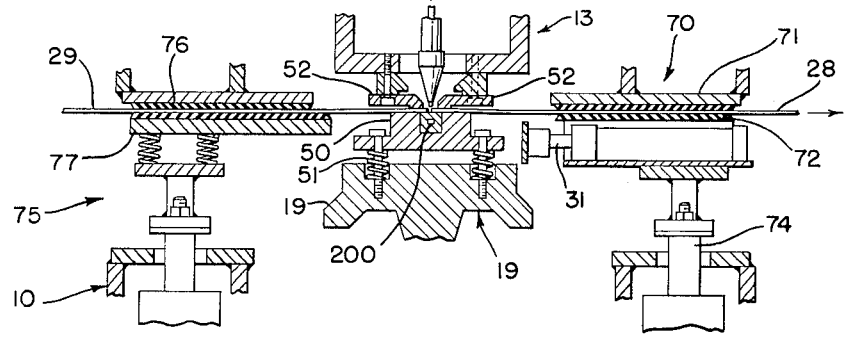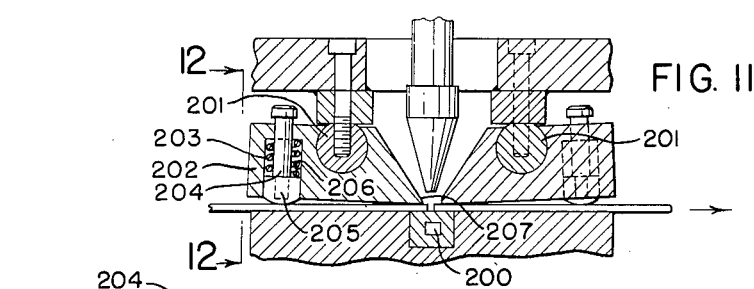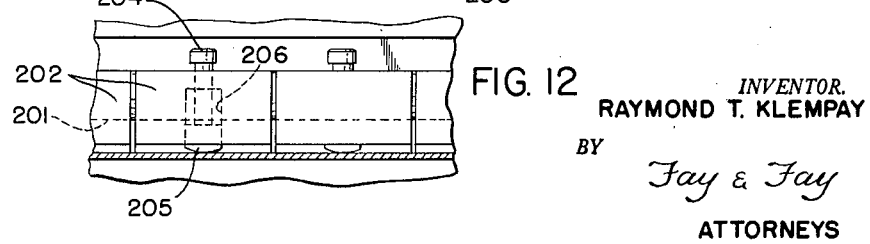

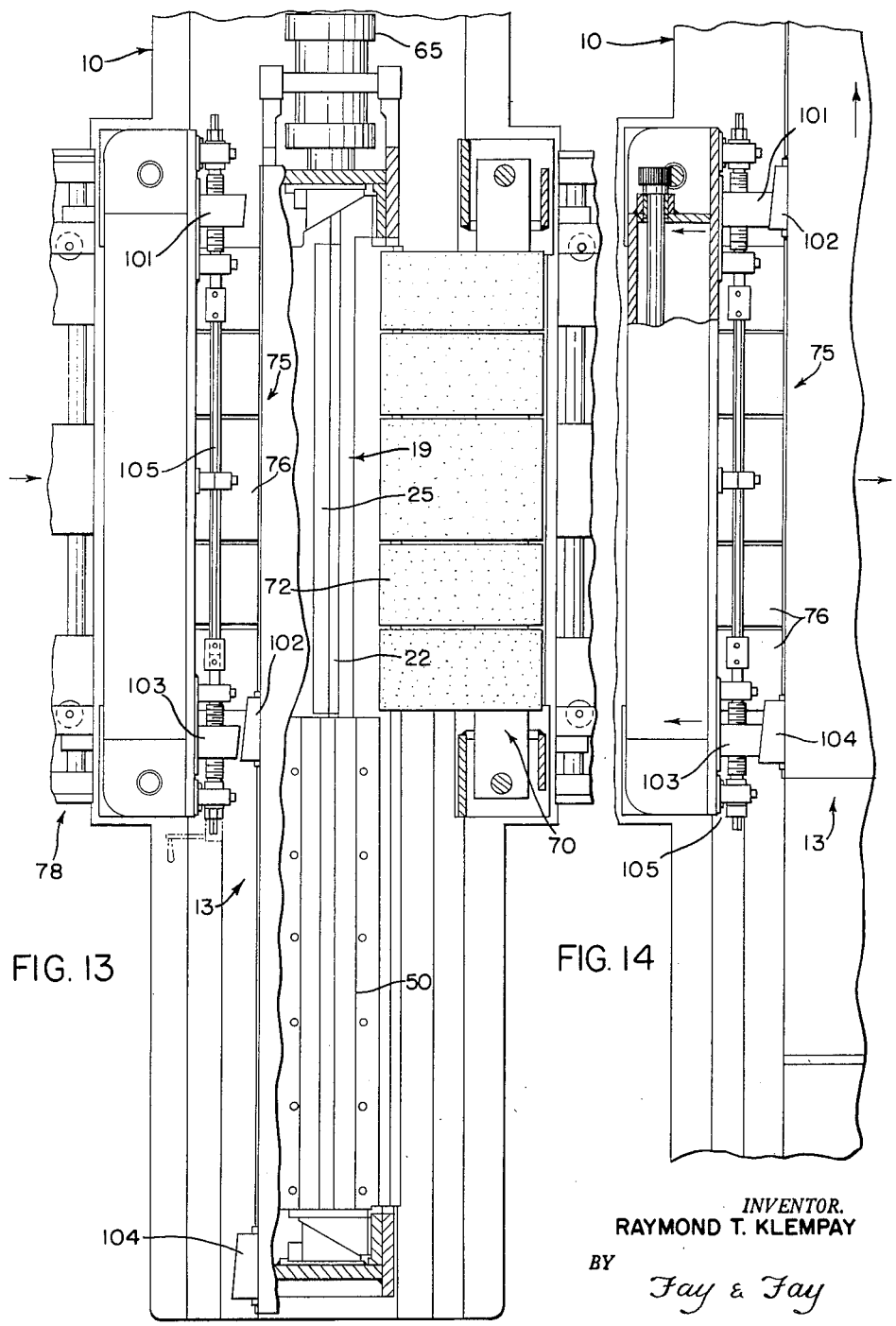

INVENTOR.
RAYMOND T. KLEMPAY
BY
*Fay & Fay*
ATTORNEYS

Aug. 3, 1965  R. T. KLEMPAY  3,198,931
SHEARWELDER
Filed Jan. 10, 1963  10 Sheets-Sheet 10

INVENTOR.
RAYMOND T. KLEMPAY
BY
*Fay & Fay*
ATTORNEYS 3,198,931
SHEARWELDER
Raymond T. Klempay, Youngstown, Ohio, assignor to
The McKay Machine Company, Youngstown, Ohio, a
corporation of Ohio
Filed Jan. 10, 1963, Ser. No. 250,546
11 Claims. (Cl. 219—124)

This invention relates to a shearwelding apparatus in general and, more particularly, to an apparatus for effecting the end-to-end welding of separate sheets or strips of material thereby to form a continuous line of strip.

Various prior art devices have been heretofore proposed for effecting end-to-end welding of sheet materials; however, they have been unsatisfactory for a number of reasons, one being the complicated structure required. Additional disadvantages have been presented in that the centering of the trailing end and the leading end has not been accurate, resulting in an offset in the joint which is undersirable. Moreover, the centering means used to effect the centering has been slow operating, thereby causing delays which keep other processing equipment idle while the centering and welding operation is completed.

A further disadvantage of prior art devices resides in the incoming web being unable to overrun the point of shearing far enough for the end to be cut completely square to the edge. The trailing end heretofore had been left on the pass line and presented an obstruction to the leading end of the new coil as it passed the point where the shearing operation occurred. With my novel means for holding the exhausted coil end off of the bed, the leading coil end is allowed to pass under the shear blade a sufficient distance so that a square, clean cut can be made, and the ends will still be in an approximate position to be welded upon being clamped by the novel toe clamp means of the instant invention.

A further advantage of my novel shearwelder resides in the provision of novel retaining pins carried by the platen which are automatically inserted into suitable bores in the upper housing prior to the shearing operation. This positively prevents misalignment of the shearing blades, thereby insuring a shart cut. Great difficulty has been encountered with prior art devices in the shearing operation. When the strip material is of sustantial thickness, the shear blades encounter resistance to passage therethrough. This results in a lateral thrust being imposed on each blade in the opposite direction, thereby spreading the same with a resultant poor cut. With my novel retaining pins, this difficulty is positively overcome, as well be described hereinafter.

An additional advantage of my novel device resides in the provision of a fluid actuatable stop means to limit the travel of the incoming coil end past the point of shear, thereby minimizing objectionable scrap to reduce the overall cost of the process.

A still further novel feature of the instant invention resides in the provision of a novel air blast ejecting means to clear scrap ends from the pass line after the shearing operation has been completed. The ejecting means is resiliently mounted in the path of the vertically movable shearing blade, and moves up to the level of the pass line upon retraction of the blade, whereupon it ejects the scrap therefrom.

With the problems of the prior art in mind, it is therefore an object of this invention to provide an improved and simplified apparatus which may be incorporated into continuous strip processing lines which is operative expediently to prepare end portions of sheets or strips for welding, and weld the same in one continuous operation, thereby to form a continuous strip.

It is a further object of this invention to provide a combined shear and welding apparatus which will join an exhausted coil end and leading coil end accurately and expediently.

It is a further object of this invention to provide a fluid actuated stop means to limit the travel of the leading end of a coil past the shear blades.

It is a still further object of this invention to provide a novel means for holding the exhausted or trailing coil end off the pass line thereby to enable the leading coil end to pass far enough past the point of shear to obtain a clean, square cut.

It is a still further object of this invention to provide a novel, high speed centering means which includes a rough centering means and a fine centering means, the two being cooperatively operated.

It is a still further object of this invention to provide a novel clamping means to hold the ends in position for welding and, in conjunction therewith, a novel spreader means to space the sheet ends properly prior to the welding operation.

It is a still further object of this invention to provide automatically movable retaining pins which hold the shear blades juxtapositioned throughout the shearing operation, thereby effecting a clean sharp cut.

It is a further object of this invention to provide heating means in the welding platen to insure good welding of thin sheets when starting from a "cold" condition.

Further and fuller objects and advantages of the present invention will become apparent upon the full consideration of the following detailed specification and accompanying drawings wherein is shown a preferred embodiment of my invention.

In the drawings:

FIG. 9 is a view similar to FIGS. 7 and 8 showing the leading end of a new coil immediately following the shearing operation;

FIG. 10 is also a view similar to FIGS. 7, 8 and 9, in which the transverse carriage has moved the shearing mechanism away and positioned the welding mechanism for the welding operation with the strip ends backed off, clamped and properly spaced preparatory to welding;

FIG. 11 is a fragmentary sectional view of a segmented toe holder modified from the design shown in FIG. 10;

FIG. 12 is a fragmentary left elevation of the toe holder taken on line 12—12 of FIG. 11;

FIG. 13 is a partial plan view of the device with approximately one-half of the top section broken away, and with the transverse carriage in one extreme position for the shearing operation;

FIG. 14 is a partial plan view showing the transverse carriage in the opposite extreme position to that shown in FIG. 13 for the welding operation;

FIG. 18 is a fragmentary sectional view taken on line 18—18 of FIG. 15;

FIG. 19 is a bottom plan view of the socket member of the positioning mechanism mounted on the transverse carriage taken along line 19—19 of FIG. 17;

Figure 4:
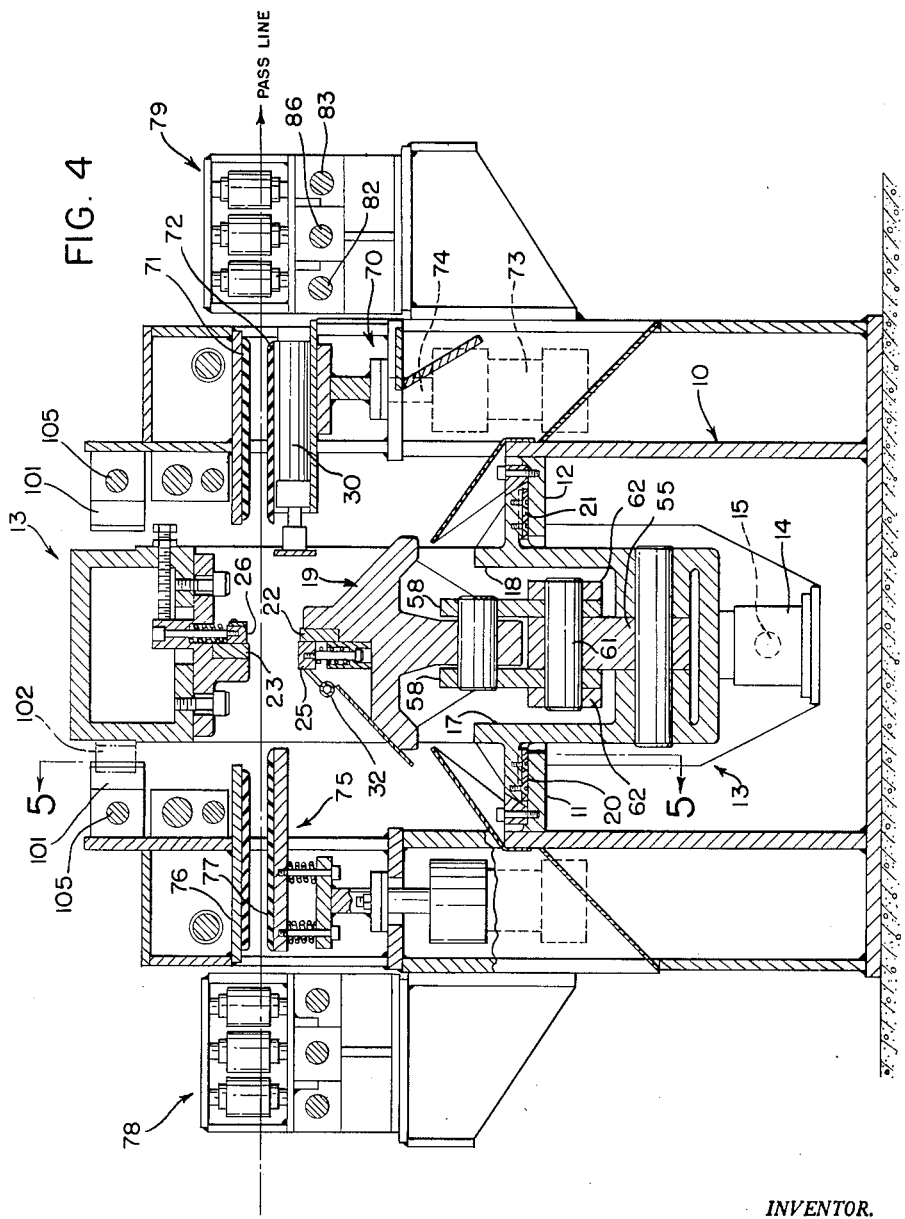
FIG. 4 is an enlarged sectional view of the apparatus taken along line 4—4 of FIG. 3.
Figure 5:
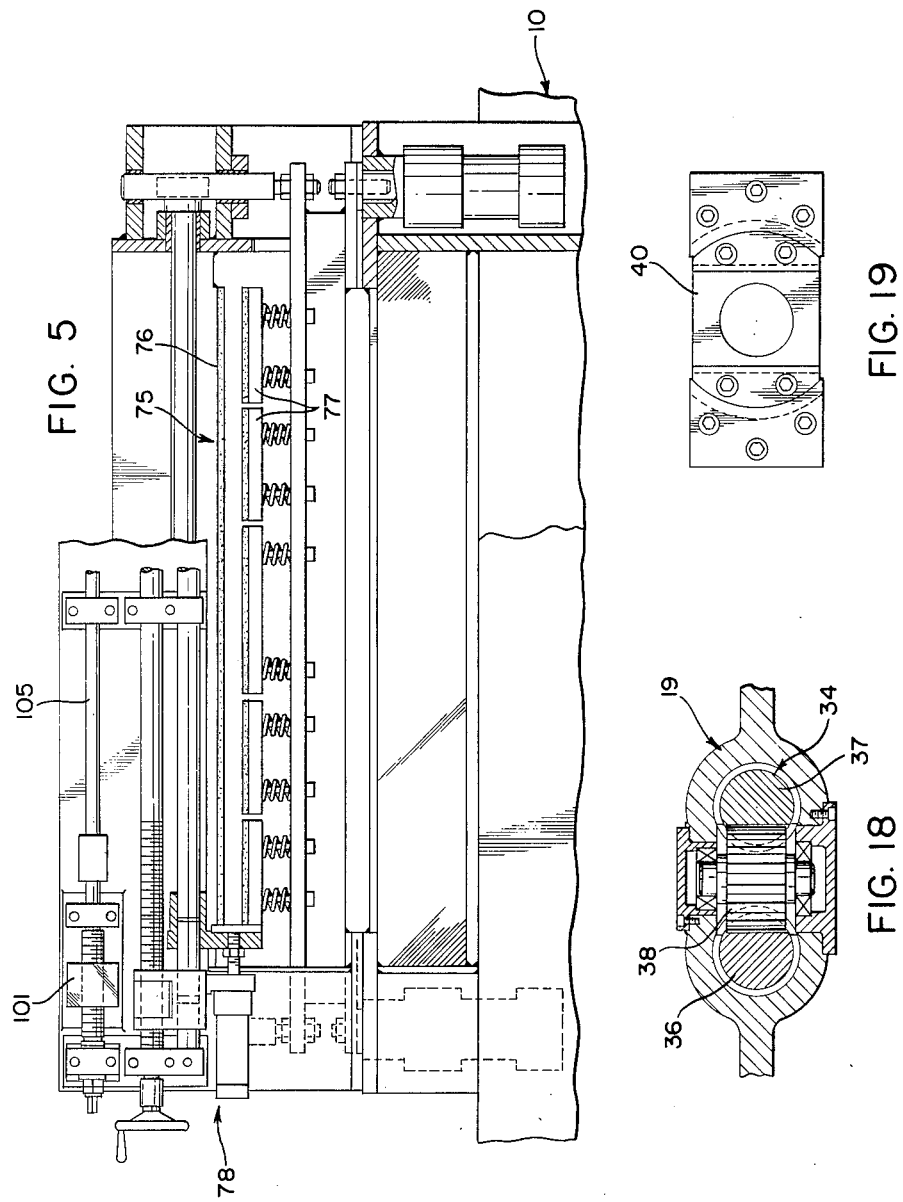
FIG. 5 is a view taken on line 5—5 of FIG. 4, partly in section.
Figure 6:
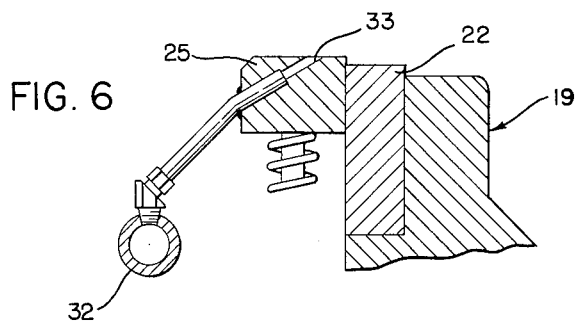
FIG. 6 is a further enlarged sectional view of the exhaust manifold and lower shear blade.

Referring now to the drawing, the numeral 10 designates generally the base or main frame of the combined shearing and welding apparatus of the present invention. Secured at the spaced end walls of the frame 10 are spaced support ways 11 and 12 (FIG. 4) which slidably support a combined shear and welder carriage structure 13.

Figure 2:
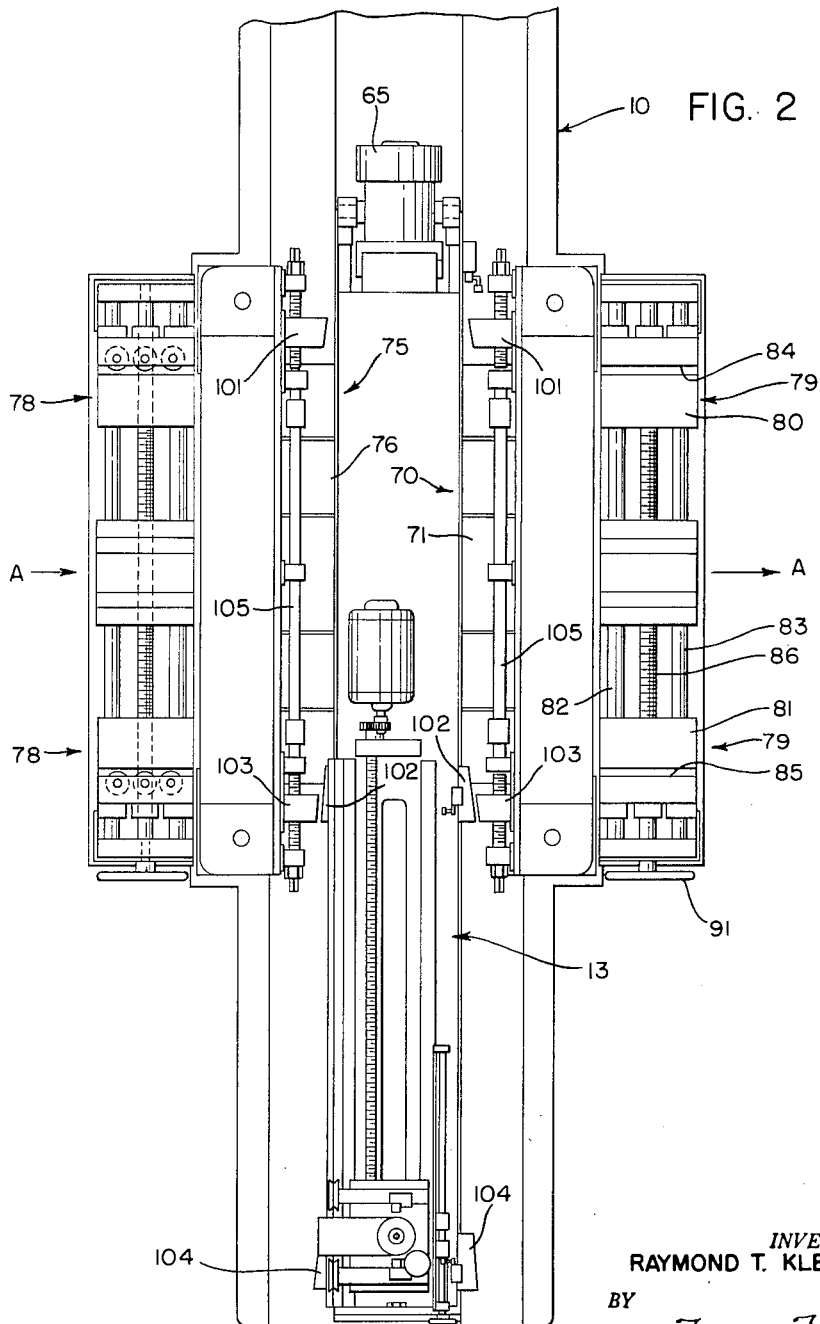
FIG. 2 is a top plan view of apparatus of FIG. 1, in arrangement for the shearing operation.
Figure 3:
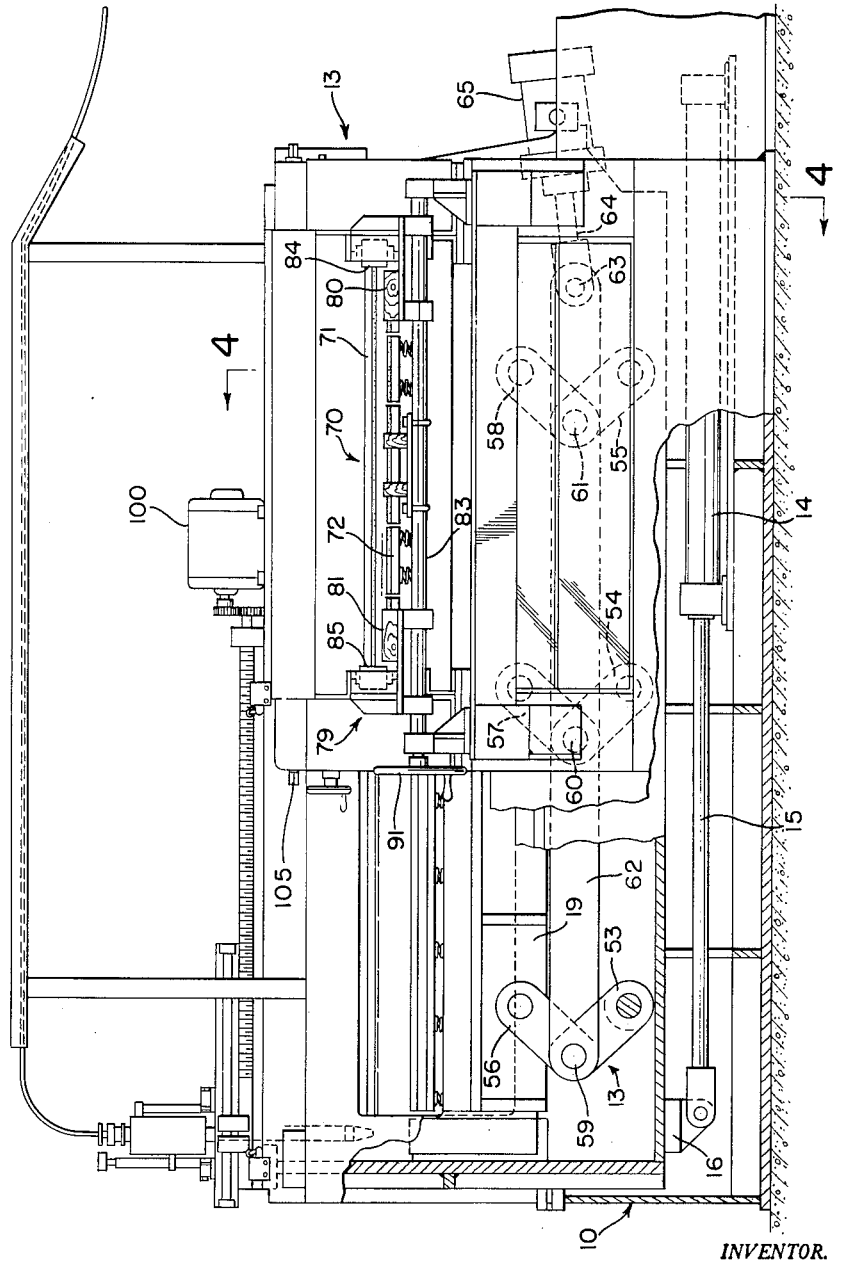
FIG. 3 is a front elevational view of the apparatus of FIG. 1, looking at the exit side.

In accordance with the teachings of the present invention, the frame 10 is in fixed position and the carriage structure 13 is arranged to be shifted transversely with respect to a generally fixed strip material pass line, the center line of which is designated by A—A in FIG. 2, so that shear and welding mechanisms, mounted on said carriage 13, may be positioned in proper operative relation to the pass line. The ways 11 and 12 provide rigid support for the carriage 13 while permitting a relatively free sliding movement from one side to the other of the other of the housing 10. As shown in FIG. 3, to effect such sliding movement there is mounted on the frame 10, below the carriage 13, a hydraulic transverse cylinder 14, having a long operating stroke. The piston rod 15 of the cylinder 14 is pivotally connected to the carriage 13 at 16 so that upon suitable application of pressure to the cylinder, the carriage 13 may be shifted from one side of the frame 10 to the opposite side as desired, thereby positioning either the shearing or welding means in the path of the pass line.

Viewed in side elevation, the carriage 13 is generally rectangular in outline, defining a rectangular window-like opening. The sides of the window-like opening are defined by spaced vertical members 17 and 18 (FIG. 4) which are provided with vertical guide ways for the slidable reception of a combined shear and welding platen carrier 19. The side members 17 and 18 are provided with outwardly extending portions having removably mounted bearing plates 20 and 21 which slidably engage the supporting ways 11 and 12.

Figure 7:
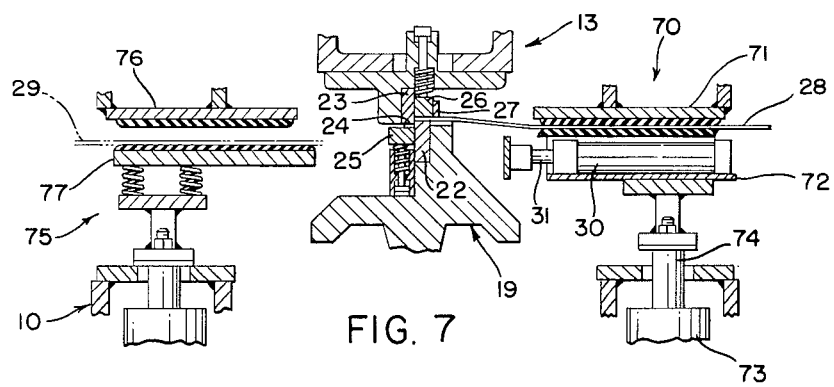
FIG. 7 is a sectional view taken along the center line of the path of travel of the strip of material showing the trailing end of an exhausted coil immediately following the shearing operation.
Figure 8:
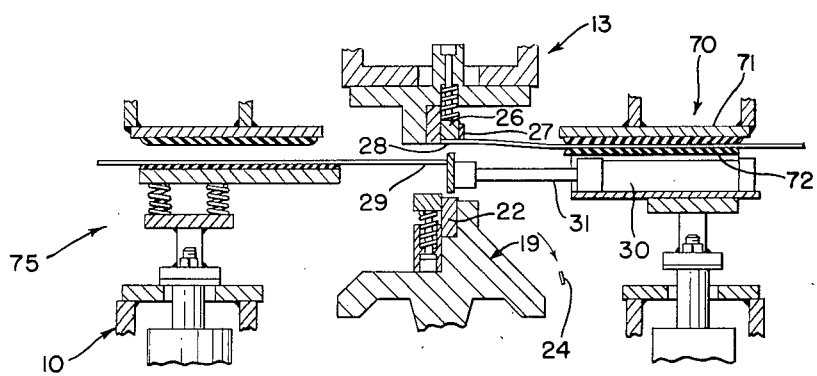
FIG. 8 is a view similar to FIG. 7 showing the leading end of a new coil positioned for shearing, prior to clamping and with the trailing end of the exhausted coil raised out of the path of the incoming new coil.

Referring now to FIGS. 4 and 6–9, there is mounted on the upper portion of carrier 19 a shear blade 22 which is adapted to have cooperative shearing engagement with a second shear blade 23 mounted rigidly on the upper cross member of the carriage 13. The arrangement is such that upon upward movement of the carrier 19, the blade 22 moves into shearing engagement with the blade 23 for shearing a strip section 24 positioned between the blades (FIG. 7). In accordance with usual shear construction, there is provided adjacent the front face of the lower blade 22 a resiliently mounted block 25 which operates following a shear operation to force the cut-off end of the strip material upwardly and clear of the blade. A second resiliently mounted block 26 is provided adjacent the front face of the upper blade 23. A series of magnets 27 are attached to the side of block 26 which contact and hold the trailing edge of the leading strip material 28 above and out of the way of the advancing edge of the following strip material 29, as illustrated in FIG. 8.

Upon the retraction of the platen carrier 19, following the shearing operation, cylinder 30 advances piston rod 31 into position to stop the advancing strip in the proper position for the second shearing operation (FIG. 8). The advancing strip is then centered, which will be hereinafter described, and clamped in position, at which time the piston is retracted out of the way, as illustrated in FIG. 9, and then a second shearing operation, similar to the one previously described, cuts off the leading edge of the advancing strip material 29. A manifold 32 (FIG. 6), which is connected to a source of compressed air, is provided with a series of air outlets 33, adjacent the shear blades. Following each shearing operation, the cut-off ends of the strip material are subjected to blasts from the air outlets 33 and ejected from the carrier 19 and guided to the scrap collector (not shown) adjacent the base of the housing 10.

Figure 15:
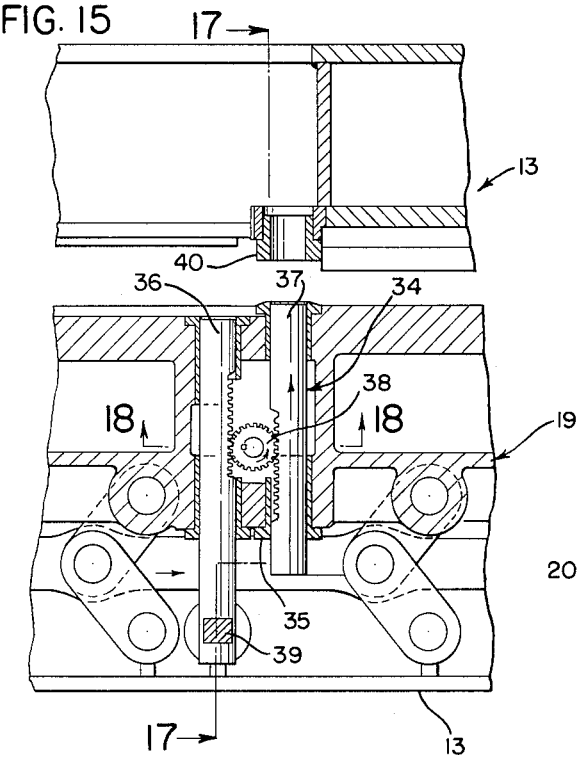
FIG. 15 is a fragmentary elevational sectional view showing a modified form of positioning mechanism for locking the transverse carriage and shear carrier together prior to the shearing operation, with the locking shaft retracted.
Figure 17:
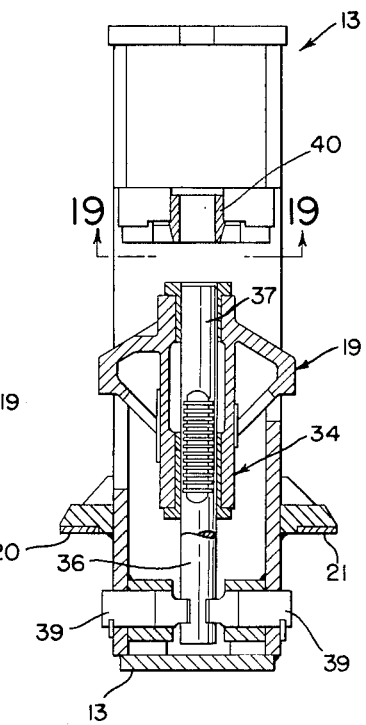
FIG. 17 is a sectional view of the positioning mechanism taken on line 17—17 of FIG. 15.
Figure 16:
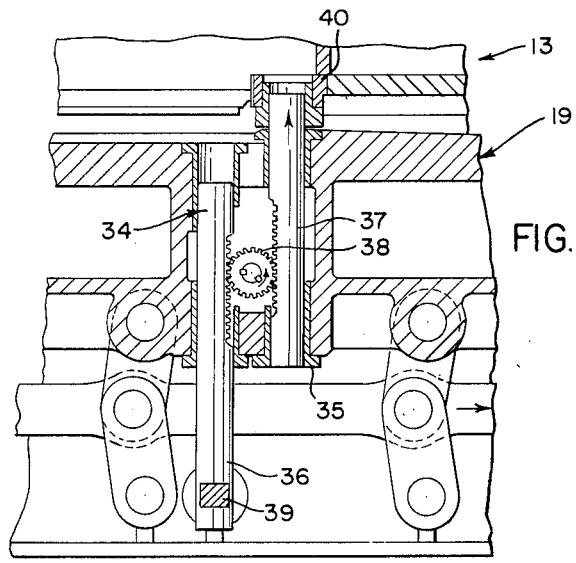
FIG. 16 is a view similar to FIG. 15, showing the locking shaft extended and in engagement with the transverse carriage during the shearing operation.

To provide means for more accurately positioning the lower and upper shear blades 22 and 23 in relation to each other, and to assure a sharp cut of the strip material, I provide a positioning mechanism 34 mounted on the transverse carriage 13, as illustrated in FIGS. 15, 16 and 17. A housing 35 is mounted on platen carrier 19, and two vertical retaining pin members 36 and 37 are slidably inserted in housing 35, spaced apart and having portions thereof provided with rack type teeth. A co-operating pinion gear 38 is mounted in housing 35 between members 36 and 37, with the teeth of the gear being similar and in engagement with the toothed rack type sections of members 36 and 37. The lower end of member 36 is attached to the lower portion of carriage 13 by retaining pins 39, as best shown in FIG. 17, or by other suitable means. A socket member 40 is adjustably mounted in the upper section of carriage 13 directly above the vertically slidable member 37 and adapted to receive the end of said member upon its upward movement. Upon the initiation of the shearing action, due to the rack and pinion design, member 37 moves upward at double the rate of the blade carrying platen 19, causing member 37 to enter the socket member 40, prior to the contact of the lower shear blade with the strip material. This locking action prevents any lateral movement of the platen carrier 19 which would cause a slight separation of the shear blades, thus causing juxtaposed sliding of the sides of the blades and insuring a sharp cut of the strip material.

As shown in FIG. 10, an electrically conductive welding platen 50 is resiliently mounted by means of springs 51 on carrier 19 and adapted for a relatively substantial vertical movement. Positioned above platen 50 and secured rigidly to the upper cross member of carriage 13 are spaced clamping plates 52. Upon upward movement of the platen 50 with carrier 19, the platen and clamping plates 52 will operate to clamp the adjacent end portions of strip material sections positioned therebetween. While this is not the principal means for clamping the strip sections, it is required for accurately aligning the adjacent ends of the strip section during the welding operation. Platen 50 and plates 52 may be comprised of separate segments, if desired, so that material of non-uniform thickness may be adequately clamped, with each clamp being individually biased.

In practice it has been found that on the initial welding operation after the machine is cold, the weld is somewhat imperfect in the thinner materials. This is obviated by heating the electrically conductive welding platen by any suitable means, as shown schematically at 200 in FIGS. 10 and 11. FIGS. 11 and 12 illustrate a modified form of clamp having a central pivot 201 around which the clamp may rotate. The heel portion 202 has an opening 206 which receives a headed stud 204 having a block 205 attached thereto. Spring means 203 urges the stud and block 205 toward the work so as to grip the work at the heel portion as well as the toe 207.

As best illustrated in FIG. 3, to provide means for the required vertical movement of the carrier 19, a series of spaced parallel toggle linkage assemblies comprising links 53, 54 and 55 are connected pivotally to the lower cross member of the carriage 13 and links 56, 57 and 58 are connected pivotally to the carrier 19. Links 53, 54 and 55 are connected respectively to links 56, 57 and 58 by pins 59, 60 and 61. A pair of elongated, transversely disposed, rigid links 62 are centrally connected to the said linkage assemblies by pins 59, 60 and 61. The right hand ends of links 62 are pivotally connected by pin 63 to the piston rod 64 of a hydraulic cylinder 65 which is pivotally mounted on carriage 13. Suitable application of fluid pressure to cylinder 65 will retract piston rod 64 drawing links 62 to the right. This movement will straighten the above described toggle assemblies and raise the carrier 19 in respect to the carriage 13.

It is to be noted that as the carrier 19 is raised, upon actuation of the cylinder 65, the lower shear blade 22 and the welding platen 50 are raised simultaneously. Thus, when effecting a shearing operation, the lower blade 22 moves into engagement with the upper blade 23, the platen 50 coming into contact with the upper clamping plates 52. However, since the platen is resiliently mounted on the plurality of springs 51, the carrier 19 is not restricted from its continued upward movement to complete the shearing operation. Conversely, when the adjacent strip ends are clamped in place between platen 50 and plates 52, preparatory to welding, the carriage has moved the shear blades transversely out of the path of the strip material and the said shear blades merely pass each other freely.

It is to be understood that the apparatus of the nature of the present invention is incorporated in continuous strip processing lines. As one coil is exhausted, its trailing end moves into the welding apparatus where it is clamped and sheared preparatory to a welding operation. Next, the leading end of a new coil moves into the apparatus and it is similarly clamped and sheared. At this time, both strip ends are clamped in the welding machine; and after positioning the adjacent strip ends in a predetermined spaced relationship, the welding operation may be performed. Following the welding operation, the clamps are released and the new coil, welded to the old coil, is drawn through the machine.

To clamp the trailing end portion of an exhausted coil, there is provided at the right hand side of the welding apparatus (see FIG. 4, also FIGS. 7, 8, 9 and 10) a clamping assembly means 70, comprising a fixed upper clamping plate 71 and a vertically movable lower plate 72. Mounted below the lower plate 72 is a fluid cylinder 73 having a piston rod 74 engaging the lower portion of plate 72. Upon application of fluid pressure to the lower end of cylinder 73, plate 72 is forced upwardly into clamping engagement with upper plate 71 to clamp the portion of the strip material positioned between the said plates.

At the entry or left hand side of the welding apparatus there is provided a second clamping mechanism 75, which is substantially equivalent to the above described clamping device 70, having an upper clamping plate 76 and a lower plate 77. The contacting faces of the said four clamping plates are provided with rubber or suitable elastomeric surfaces to compensate for irregularities in the strip material.

Figure 1:
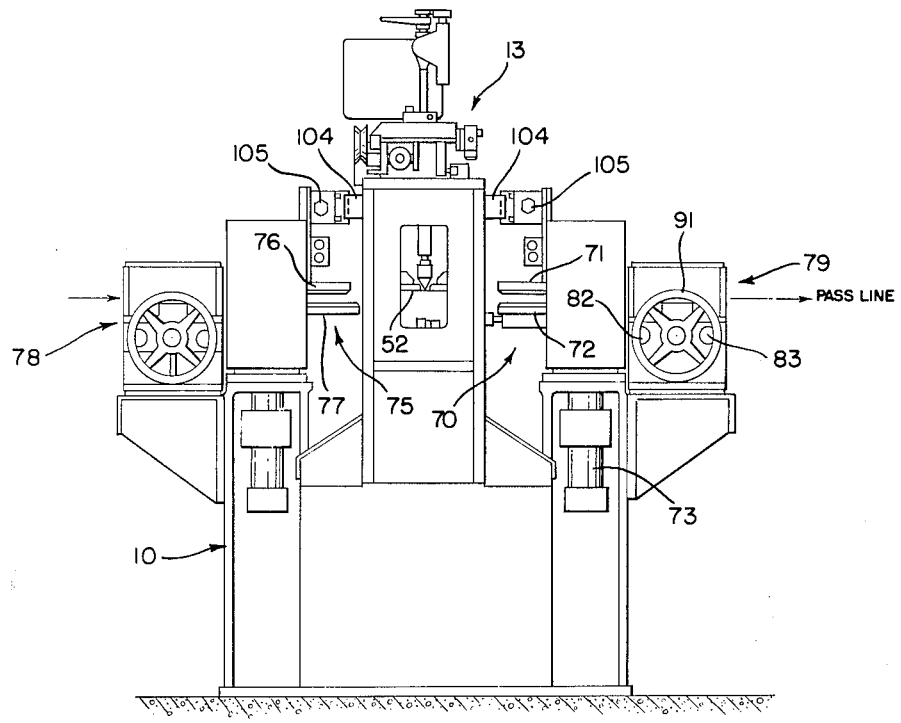
FIG. 1 is a side elevation of a combined welding apparatus constructed in accordance with the teachings of my invention.

In order to insure that the adjacent strip ends are properly aligned prior to clamping for welding, I have provided a pair of aligning or centering devices of modified form which would be positioned at 78 and 79 in FIG. 1. A pair of centering devices 79 are shown in more detail in FIG. 20 and 21. Since each operates in the same manner, description of one should suffice. The centering device consists of a pair of carrier members 80 and 81 slidably mounted on a pair of support rods 82 and 83. Carrier members 80 and 81 are provided with upwardly projecting portions 84 and 85 for engaging the edges of the strip. Movement of carrier members 80 and 81 is provided by a shaft 86 provided with right hand and left hand threads at opposite ends, respectively, said threads engaging correspondingly threaded holes in carriers 80 and 81. The arrangement is such that upon rotation of shaft 86, carrier members 80 and 81 will have equal but opposite movement to facilitate adjustment for varying widths of work.

The centering device 79 is mounted on frame 10 transversely to the path of the strip material and so located that upwardly projecting portions 84 and 85 may be brought into guiding contact with the opposite side edges of the strip material 91 (shown in phantom) to guide and hold the same centered with respect to the clamping device positioned at the trailing end of the exhausted coil.

At the opposite side of the welding device, as shown in FIG. 1, there is provided the second pair of centering devices 78, which is substantially equivalent to the above described centering device 79, and which functions to align the entering end of the new coil with the trailing end of the exhausted coil.

Figure 20:
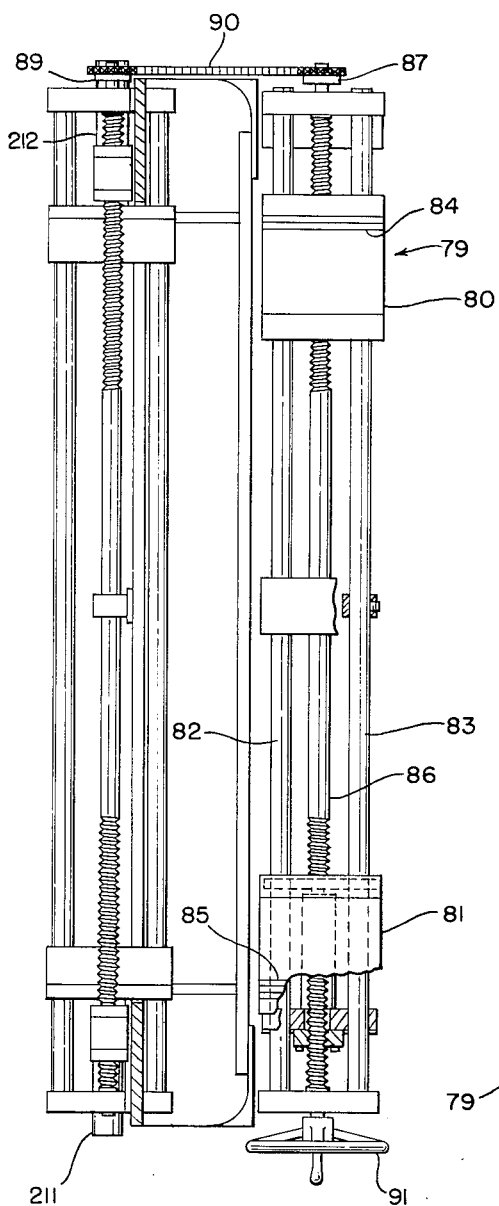
FIG. 20 is a plan view of a portion of the apparatus illustrating the device for centering and aligning the strips of material prior to the shearing and welding operations.
Figure 21:
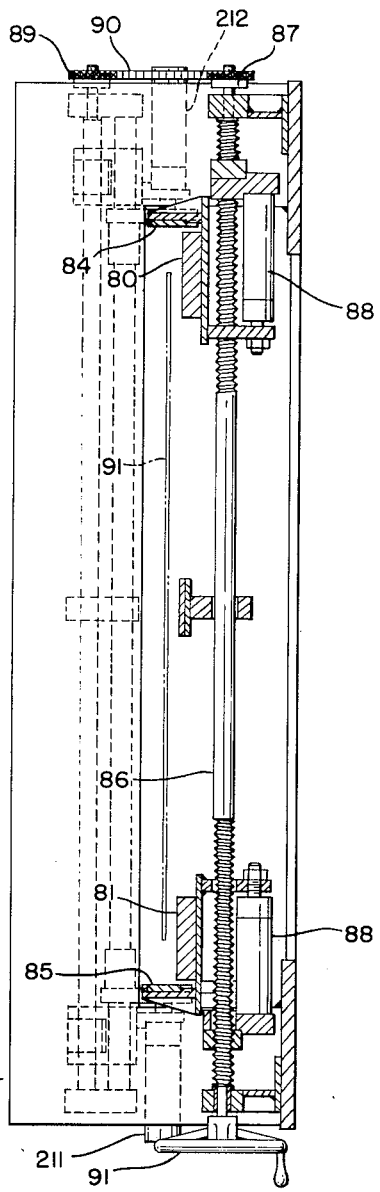
FIG. 21 is a side elevation of that portion of the device shown in FIG. 20.

As is best seen in FIGS. 20 and 21, the shaft 86 projects from the ends of the housing and is provided with a crank 91 on one end and a sprocket 87 keyed to the other end. The crank 91 may be manually rotated to effect adjustment of the fluid operated cylinders 88 on guides 84 and 85 inwardly or outwardly. The adjustment of the first pair of cylinders moves the second pair 211 and 212 by means of the sprockets 87 and 89 being connected by a chain 90 to duplicate the position. This facilitates rapid adjustment of the pair of guides; however, it is normally used as an initial adjustment for width, with the cylinders energized, and thereafter the cylinders perform the centering function. The guides 84 and 85 are in close proximity to the edges after adjustment and upon actuating of the piston in the cylinder 88, engage the work to center it. Simultaneously therewith guides carried by the cylinders 211 and 212 engage the work in a similar manner. The lines to each cylinder are cross-connected so that they are balanced when under fluid pressure. A similar arrangement is provided in the centering device 78 for centering the incoming strip, which operates in the same manner.

To provide the gap between the trailing and advancing ends of the strips required for welding of the same, as shown in FIGS. 10 and 11, I have provided two pairs of wedge blocks 102 and 104 (see FIGS. 13 and 14) at the sides of the transverse carriage 13 and a second pair of blocks 101 and 103 mounted on frame 10, so positioned that as the carriage 13 is moved from the shearing to the welding position and just before it comes to rest, the said wedge blocks engage with sufficient force to cause the strip clamping members on either side to move outwardly a fraction of an inch, thus providing a small space between the cut ends of the two coils. Wedge blocks 101 and 103 are movably mounted and their positions are manually adjustable by rotation of shafts 105, which are in threaded engagement with the said blocks.

The normal operation of my novel shearing and welding apparatus of the present invention will now be explained. The trailing end of an exhausted coil is centered by the centering means generally indicated in FIG. 1 at 79. The clamping plates 71, 72 are moved toward each other to hold the strip material. The hydraulic cylinder 65 then is actuated, which straightens the toggle mechanism, bringing the shearing blades into engagement with the strip. Simultaneously with the moving of the shearing blades, the retaining pins are advanced upwardly at double the rate of the shear blade to be inserted in the bores 40 in the upper blade assembly 13, which action can be understood best by reference to FIGS. 15 and 16. The de-energizing of the cylinder 65 retracts the lower shear blade, as well as the centering pins 37, from the bore 40. As the lower blade assembly is lowered, magnetic means 27 is energized and the trailing end is held along with the upper blade to clear the pass line. The scrap end, which is cut by the shearing operation, is ejected by manifold air jets 33. The piston rod stop 31 then extends as the leading end of the next coil enters. When the leading end of a new coil engages the piston stop 31, the travel of the strip material is halted, at which time the centering means 78 aligns the strip with respect to the exhausted strip so as to have the edges square with the shearing blade. The shearing operation is again repeated after the entry clamps have been brought into engagement with the strip material. The scrap which is cropped from the end of the leading strip is ejected in the same manner as the scrap of the exhausted strip. The shear is then retracted and the magnets deenergized so as to leave the ends of the leading and exhausted strip juxtaposed on the pass line. The carriage 13 then is shifted transversely of the coil strip on the supporting ways 11 and 12, due to the energization of the cylinder 14. This brings the welding plate 50 and clamping plates 52 into the path of the pass line. Cylinder 65 again is energized and the carrier 19 is raised to hold the heated electrically conductive plate 50 in contact with both strip ends. Simultaneously, the wedge blocks 101, 102, and 103, 104 are engaged to spread the ends of the work a predetermined distance in order to compensate for the various thicknesses of metals run.

As heretofore described, the screws on which the wedges 101 and 103 are carried are manually adjustable so that the tapers between the wedge blocks 101 and 103 cooperating with 102 and 104 on the carriage respectively can be set for any given distance between ends that is desired. It is obvious with material which is very thin that little or no spreading is desired, whereas with thick material a substantial distance is required.

The welding clamp plates 52 are then engaged by the work being moved upwardly by the lower platen. The clamp plates 52, as previously described, are comprised of a series of independent clamps which will conform to any irregularities in the thickness of the strip material.

The actual welding operation is now performed as described in detail in my Patent No. 2,874,266. It is to be noted that the welding head is moved laterally across the work by a motor with a timing belt drive with a Beaver Advance screw which effects a smooth, uniform operation. Use of this novel arrangement prevents any vibration of the motors or machine to be transferred to the welding head. The welding head, therefore, is very accurate in its path of travel and little or no play exists in the overall device. This is particularly important where thinner strips are to be welded because of the close control that is required.

Upon completion of the welding operation, carrier 19 retracts and the welding clamp plates are released, thereby unclamping the strip. The carriage 13 then is shifted transversely to bring the shears in alignment with the pass line and the strip can be fed through the shear welder until another exhausted coil end is presented.

The welded joint is then passed on to another station (not shown) where the weld is ground to a smooth finish, if necessary to be suitable for use in further processing.

While I have shown but a single embodiment in order to illustrate the principles of the invention, various changes may be made without departing from the scope thereof. Accordingly, I intend only to be limited by the scope of the appended claims.

I claim:

1. In a shearwelder having a pass line to receive leading and trailing ends of strip material, centering means to position said trailing end, clamp means to hold said trailing end, shearing means in said pass line for trimming said trailing end, retaining pin means to hold said shearing means in alignment, means to hold said trailing end above said pass line while a leading end is introduced, stop means to limit the travel of said leading end a short distance past said shearing means, centering means to align said leading end with said trailing end, clamp means to hold said leading end while said shearing means trims said end, and means displacing said shearing means in the pass line to clamp, spread, and weld said ends.

2. The structure under claim 1, wherein each of said centering means includes fluid advanced vertically projecting portions for engaging the sides of said strip.

3. The structure of claim 1, wherein the means to spread and clamp said ends includes a plurality of toe clamps engaging said strips.

4. The structure of claim 1, wherein the means to hold said trailing end above the pass line is a magnet.

5. The structure of claim 1, wherein said stop means comprises an adjustable stroke hydraulic piston which has means thereon to engage the leading strip end.

6. The structure of claim 1, wherein the shearing means comprises upper and lower blade assemblies which are movable toward each other and the retaining pin means includes a bore in the upper blade assembly and an extendable and retractible pin carried by the lower blade assembly.

7. The structure of claim 6, wherein said extendable and retractible pin is actuated by the vertical travel of the lower blade assembly at a rate about double said lower blade assembly.

8. The shearwelder of claim 1, wherein said means displacing said shearing means to clamp, spread and weld said ends includes a heated platen which is adapted to be moved vertically into engagement with said ends.

9. A shearwelder comprising a pass line for receiving a strip of material, first centering means for centering the end of an exhausted coil, first clamp means to clamp said end, means to shear the end of said coil including a pair of blades, means to hold said end out of engagement with said pass line, said means including a magnet, second centering means for centering a leading coil end, second clamp means to hold said leading end while said aforementioned shear means trims said end, transverse carriage means to move said shear means laterally of the pass line, and simultaneous therewith to actuate means to spread said ends while positioning a welding means over said ends for joining thereof, movable retaining pin means for holding said shear blades juxtaposed during the cutting operation, and toe clamp means to grip said ends during the welding operation.

10. In a compact combined apparatus for shearing and welding strip sections, the combination of a base supporting a pass line for said strips, first centering means to position a first strip end, means to clamp and shear said end, means to hold said strip end above said pass line to permit the introduction of a second strip end past said shear means, fluid actuated stop means to limit the travel of said second strip end, second centering means for centering said second strip, second clamp means to clamp said second strip while said first mentioned shear means trims the second strip end, means to eject the trimmed portion, toe clamp means to cooperate with a transversely and vertically movable welding platen to hold said strip ends spaced, said spacing being achieved by wedge means cooperating with wedge means on said platen, said wedge means to space said strip comprising wedge blocks carried by said transversely movable welding platen which cooperatively engages adjustable wedge blocks carried by said clamping means whereby movement of said platen under the pass line spreads the strip ends, and welding means to join said strips.

11. A compact shearwelding device comprising a base having a pass line for strip material thereabove, a carriage slidably supported on said base for movement transversely of said pass line, shearing means on one end of said carriage and welding means at the opposite end thereof, said shearing means including upper and lower vertically movable blades, said shearwelder further having retaining pin means including pins carried by the carriage which are automatically inserted in a bore in the upper blade assembly simultaneously with the shearing operation, means to move said shearing and welding means in the path of said pass line, single means for operatively actuating said shearing means and raising said welding means vertically up to the pass line, centering means to align said strip, and independent toe clamp means to engage said strip material when said welding means is in the path of said pass line while the welding operation is performed.

References Cited by the Examiner

UNITED STATES PATENTS

| | | | |
|---|---|---|---|
| 2,399,646 | 5/46 | Linden | 219—160 X |
| 2,815,437 | 12/57 | Reed et al. | 219—82 X |
| 2,874,266 | 2/59 | Klempay | 219—124 |
| 3,032,639 | 5/62 | Nesmith | 219—161 X |

RICHARD M. WOOD, *Primary Examiner.*

JOSEPH V. TRUHE, *Examiner.*